United States Patent
Zivkovich

(10) Patent No.: US 10,113,623 B2
(45) Date of Patent: Oct. 30, 2018

(54) ORBITUAL CRANKSHAFT WITH EXTENDED CONSTANT VOLUME COMBUSTION CYCLE

(71) Applicant: Borislav Zivkovich, Hammond, IN (US)

(72) Inventor: Borislav Zivkovich, Hammond, IN (US)

( * ) Notice: Subject to any disclaimer, the term of this patent is extended or adjusted under 35 U.S.C. 154(b) by 126 days.

(21) Appl. No.: 15/166,255

(22) Filed: May 26, 2016

(65) Prior Publication Data
US 2017/0343091 A1    Nov. 30, 2017

(51) Int. Cl.
| | |
|---|---|
| *F02B 75/32* | (2006.01) |
| *F02B 75/04* | (2006.01) |
| *F16H 37/12* | (2006.01) |
| *F16C 3/12* | (2006.01) |
| *F16C 3/14* | (2006.01) |

(52) U.S. Cl.
CPC .......... *F16H 37/124* (2013.01); *F02B 75/32* (2013.01); *F16C 3/12* (2013.01); *F02B 2275/36* (2013.01); *F16C 3/14* (2013.01)

(58) Field of Classification Search
CPC ...... F02B 75/32; F02B 2275/36; F02B 75/02; F02B 2075/025; F02B 2075/027; F16C 3/12; F16C 3/14; F16C 3/06
USPC .......................... 123/197.4, 48 B, 78 E, 78 F
See application file for complete search history.

(56) References Cited

U.S. PATENT DOCUMENTS

| | | | | |
|---|---|---|---|---|
| 5,908,014 | A | * | 6/1999 | Leithinger ............ F02B 75/048 123/48 B |
| 5,979,375 | A | * | 11/1999 | Ballardini ............... F02B 75/32 123/197.4 |
| 7,174,865 | B2 | * | 2/2007 | Sakita ................... F02B 75/047 123/197.4 |
| 2002/0117129 | A1 | * | 8/2002 | Aoyama ................... F01B 9/02 123/48 B |

* cited by examiner

*Primary Examiner* — Syed O Hasan
(74) *Attorney, Agent, or Firm* — Miller, Matthias & Hull LLP

(57) ABSTRACT

An improved internal combustion engine utilizes at least one orbital body with at least one orbiting rod journal offset and engaged in a specific way from the center of orbiting body. Further, orbiting body together with orbiting rod journal and one of the gears as one body, rotationally linked to the block via stationary second gear engaged in 1:1 ratio. Which transfers the rotation to main journal via flying arm. Such that radial motion of flying arm transfers the rotation to the main crankshaft axis and constitute one body. This results in a constant volume compression period of max. 60°, improving operation, efficiency and cleanliness of the engine.

11 Claims, 14 Drawing Sheets

ORBITUAL CRANKSHAFT WITH EXTENDED CONSTANT VOLUME COMBUSTION CYCLE

TECHNICAL FIELD

The present disclosure is related generally to internal combustion engines and, more particularly, to a system and method for providing a substantially constant volume period within the combustion cycle.

BACKGROUND

Under an onslaught of regulatory and economic demands, reciprocating internal combustion engines (ICEs) have come very close to peak efficiency and NOX emission reduction. However, such engines, both spark-ignited and compression-ignited, are facing new challenges with respect to mileage and efficiency due to the price of petroleum and petroleum distillates.

Existing spark and compression-ignited ICE utilize a crankshaft with a rod journal that remains at a constant distance to the center of main rotation. This structure, based on the wheel and eccentric pin, has been used essentially unchanged since the $14^{th}$ century to produce very simple reciprocating mechanical movements, i.e., to break stones, calendar cereals, and for hammering and shaping metals.

The eccentric pin with constant distance to the center of rotation was inherited and implemented in external heat Alfa Sterling steam engines, which were conceived and patented by Jean-Joseph Etienne Lenoir in 1860. A short time later in 1867 Paris, Nicholas August Otto constructed and demonstrated the first internal combustion engine. Continuing this progress, Herbert Stuart invented the first fuel pressure-injected internal combustion engine in 1891, and in 1892 Rudolf Diesel patented essentially the same structure.

For turn of the century industry and society, the eccentric pin with constant distance to the center of rotation in an external engine was a useful concept due to external preparation of the pressure. For example, a steam engine does not benefit from any amount of piston dwell time at TDC (top dead center). Indeed, extended dwell time would cause the steam charge to lose a small amount of heat energy, reducing efficiency.

However, for use in ICEs, the eccentric pin with constant distance to the center of rotation has numerous disadvantages, especially with respect to the piston's movement around top dead center. In the first shorten 90° of moving from BDC (bottom dead center) toward TDC, the piston is moving relatively slowly, meaning that the temperature of the charge is also increasing only slowly. In second 90° of crank rotation from BDC, the piston has a longer more linear response, which means it travels faster and raises the charge temperature faster. This sequence sets very strict parameters on combustion timing which only certain octane-hexogen proportions fuel will successfully and efficiently burn.

Moreover, the existing eccentric pin at constant distance provides only a brief moment near TDC for oxygen electrons to atomize all fuel molecule compounds. Indeed, without allowing for slight looseness in tolerances, there is essentially no constant volume regime anywhere along the piston's travel. Allowing for tolerances, and using a loose definition of "constant," perhaps one could say that from −4° to+4° (1/45 of 360°) the piston doesn't change the volume of the combustion chamber appreciably. At 720 RPM, this period would last 0.0018 sec. Increasing RPM from idle will further shorten the duration of the pseudo-constant volume regime at TDC.

The lack of time at TDC has been generally known, and solutions have been attempted. VCR and variable ignition system as well as increases in charge volume, pressure and charge temperature have been used to support better timing of the spark or peak of compression before ignition. This system had only a small effect on efficiency, but added extra resistance at a critical angle of the peak of the combustion process.

Another technique, forced induction and direct injection, would bypass inadequate sequence of speed in the combustion cycle. However, this system is extremely complex and expensive; the air must first be compressed, then cooled and then compressed again all in one combustion cycle. Even figuring conservatively, operating pressures in direct injection fuel lines, may exceed 8 times higher pressure than that found in camber at that momentum, after the turbocharger shovels in the air. This system achieves a certain level of atomization, but it is still not complete. Although this system has successfully reduced NOx emissions and increased operational energy, it is, again, an extremely complex system mechanically.

Another deficiency of all ICE-s with the conventional piston configuration is the piston's excessively rapid motion after TDC, for the at least first 90° or 120°. System with constant distance of the rod journal to the center of rotation is seen on the FIG. #2. The piston after reaches TDC and is moving back to the center of main rotation now is mechanically ordered to follow reversed order of sequence of speed, what just had in previous motion. That order is inadequate, considering that the charge needs some extra time to fully atomize the fuel molecules and droplets found in combustion room.

That kind of mechanical order of speeds of piston provides very short torque conversion. Namely, the speed of the flame and useful expansion of the gases is what creates the primary force, which lasts a very short angular time due to fast volumetric increase. It shortens the useful or practical power stroke to an average of 60 ° degrees, with conventional piston response. The primary force can stay ahead of secondary force for just 60 ° degrees, and leaves the system with power gaps of roughly of 120°(20° at TDC plus from 80° to 180°).

While the present disclosure is directed to a system that can eliminate certain shortcomings noted in or apparent from this Background section, it should be appreciated that such a benefit is neither a limitation on the scope of the disclosed principles nor of the attached claims, except to the extent expressly noted in the claims. Additionally, the discussion of technology in this Background section is reflective of the inventor's' own observations, considerations, thoughts, and is in no way intended to accurately catalog or comprehensively summarize the art currently in the public domain. As such, the inventors expressly disclaim this section as admitted or assumed prior art. Moreover, the identification herein of a desirable course of action reflects the inventor's' own observations and ideas, and should not be assumed to indicate an art-recognized desirability.

SUMMARY

In keeping with an embodiment of the disclosed principles, an improved internal combustion engine utilizes at least one orbital rod journal rotationally linked to the center of orbiting body (constitutes one orbiting body 92,93), but radially offset from the center of orbiting body axis. The orbital body with orb. rod journal orbits together with gear #1 around gear #2 which is fixed to the block, and is stationary object. The spur gears set has 1:1 ratio. Further orbiting body orbits inside sliding bearing on one side of the flying arm 96. The other side of the flying arm 96 is directly connected to the main journal 25, and constitutes one body. Flying arm and main journal as one body rotates inside and is fixed to the block bearing (#2) 98 via sliding bearing, herein omitted in the draft. Orbiting rod journal 22 influenced from expansion gases via connecting rod 42, orders the orbiting rod journal 22 to rotate around center of orb. body 24, and at the same time transfers rotational energy via flying arm to main journal. This unique mechanical engagement results in a constant volume combustion period of maximum 60°, improving operation, efficiency, and cleanliness of the engine.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings.

DETAILED DESCRIPTION

Before presenting a fuller discussion of the disclosed principles, an overview is given to aid the reader in understanding the later material. As noted above, the use in ICEs of a constant radius (eccentric pin) rod journal system has numerous disadvantages, especially with respect to the piston's movement around top dead center and the extraction of energy from the fuel. In general, these problems include inefficient combustion, complex charging requirements and systems, and a short power stroke.

However, within the invention, in certain embodiments, the combustion chamber is held at constant volume at and around TDC. This feature prolongs the period during which effective combustion can take place, leading to greater efficiency without extreme complexities or accessories. The system can be used in singles, twins, and triple orbiting body design and so on, and within some configurations, its use essentially eliminates vibration and provides continuous torque application.

In all its configurations, the disclosed ECVC provides many advantages. These include fuller atomization at TDC, the highest possible pressure from a given charge, and an extended power stroke. In addition, the ECVC provides overlapped power strokes for a duration of up to 36°. The design also reduces the negative work needed to complete the compression cycle and provides a longer torque application from each cylinder. Moreover, as the cylinder pressure drops from 75° after TDC, the physical leverage of the arrangement gradually increases relative to the main center of rotation.

In addition, the design provides a reduction of heat transfer to the surroundings due to fuller atomization during the extended TDC dwell time. Relatedly, this reduces or eliminates the sound of unfinished atomization, registered when the exhaust valves open. Accessories normally used to attempt to provide fuller atomization are no longer needed.

With this overview in mind, and turning now to a more detailed discussion in conjunction with the attached figures, the techniques of the present disclosure are illustrated as being implemented in an ICE (internal combustion engine). An ICE, whether spark-ignition (gasoline, alcohol, propane and natural gas engines), compression-ignited (primarily diesel engines), two or four cycle concepts, uses the expansion of the gases to push a piston within a cylinder. While other types of piston version ICEs are possible, e.g., the split cycle engine, these engines are not the subject of this disclosure.

Figure 1:
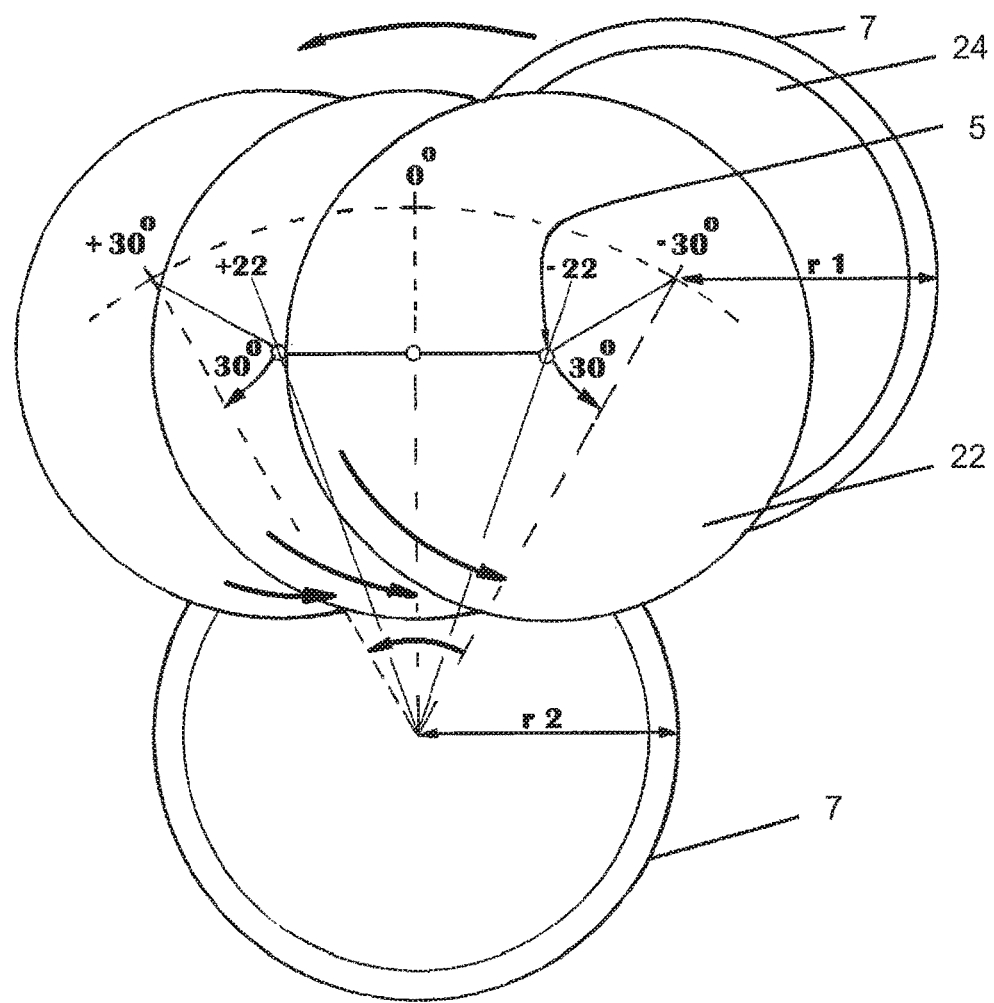
FIG. 1 is an schematic illustration of a main journal with conventional rod journal and main journal with orbiting rod journal system in accordance with an embodiment of the disclosed principles.

The schematic diagram of FIG. 1 shows an orbiting rod journal system in accordance with an embodiment of the disclosed principles. As can be seen, this embodiment has omitted the full size of orbiting body 24 (in this case gear 1. The figure shows only the cross symbol as a center of 360° rotation of the orbiting body with the eccentric rod journals. The figure shows orbiting rod journals in the front of the orbiting body for visual presentation. When orbiting body 24 together with gear 1 is moving from the positions at −30° via 0° to +30°, orbiting rod journal follows its own orbiting path and from −22° to +22° to the main center of rotation, that is shown with a straight connecting line. Straight connecting line is leading to cause mechanical pause in piston motion, herein called geometrical creation of Extended Constant Volume Combustion Cycle.

The same FIG. 1 presents the offset coefficient selected for this illustration. This illustration shows the selected maximum and fixed coefficient, which presents center of orbiting rod journal distanced, at a radius of 0.52339, the radius of gear 1. The radius of gear 1 is equal to the radius of the gear 2.

As can be seen, the double orbiting configuration keeps the orbiting rod journal 5, to which the connecting rod is attached, vertically stationary for an extended period at and about TDC. This provides a constant volume combustion cycle for a prolonged period compared to the traditional arrangement. When the conventional rod journal reaches the position of 90°, the orbital rod journal will be at its own 180°, and at end of 180° of the traditional rod journal, the orbital rod journal will be at its own 360° rotating around center of orbiting body 24.

Figure 2:
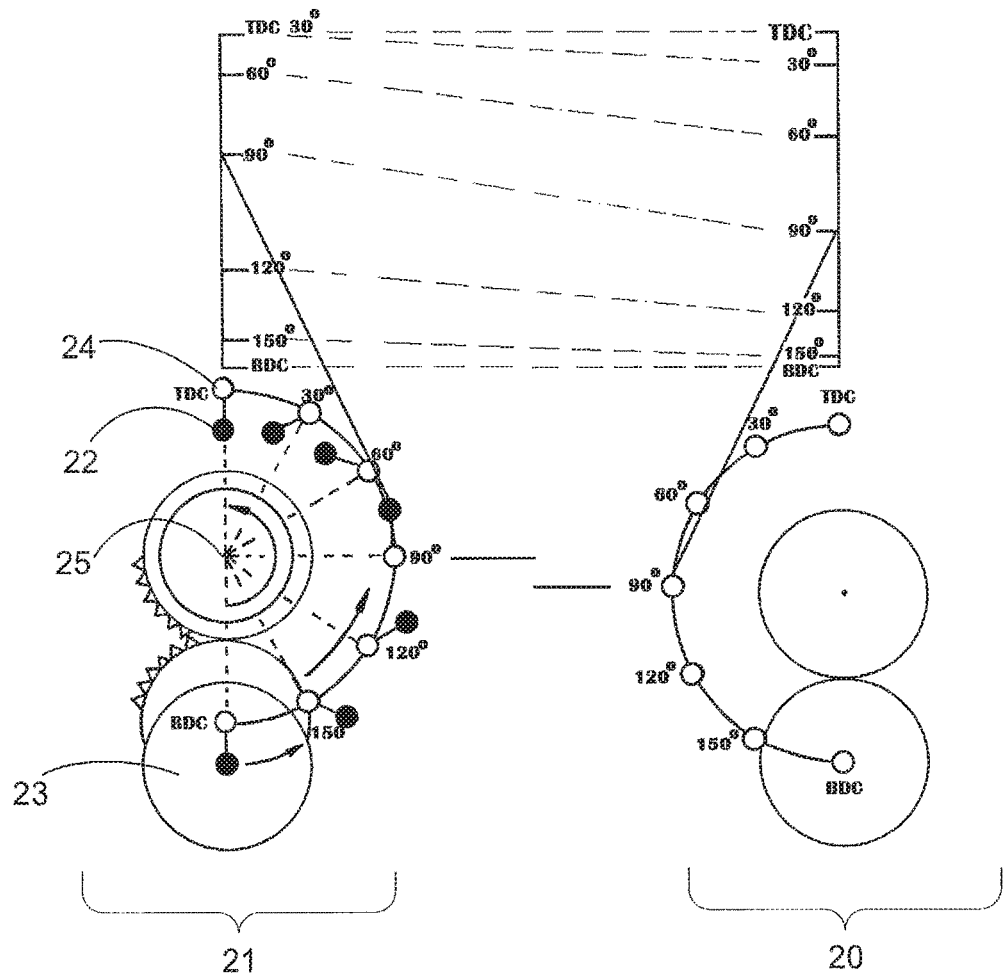
FIG. 2 is a schematic comparison between a conventional engine configuration and a configuration in accordance with an embodiment of the disclosed principles.

FIG. 2 shows a schematic comparison between a conventional engine configuration 20 and a configuration 21 in accordance with an embodiment of the disclosed principles. In particular, the conventional configuration 20 lies to the right and the new configuration 21 to the left. The scalars above the center drafts are horizontally lined up and represent the piston's response to each 30° increment of crankshaft rotation. As can be seen, the new configuration 21 shows how reversed sequence of speeds of the piston, can positively affect the thermodynamic process when converting from straight linear to rotary motion. On the way from TDC towards BDC the piston will be always at lower volumetric increase compared to the conventional concept. This configuration also yields greater torque application starting from 30° crankshaft rotation after TDC and a longer angular duration of primary forces (practical power strokes).

Figure 3:
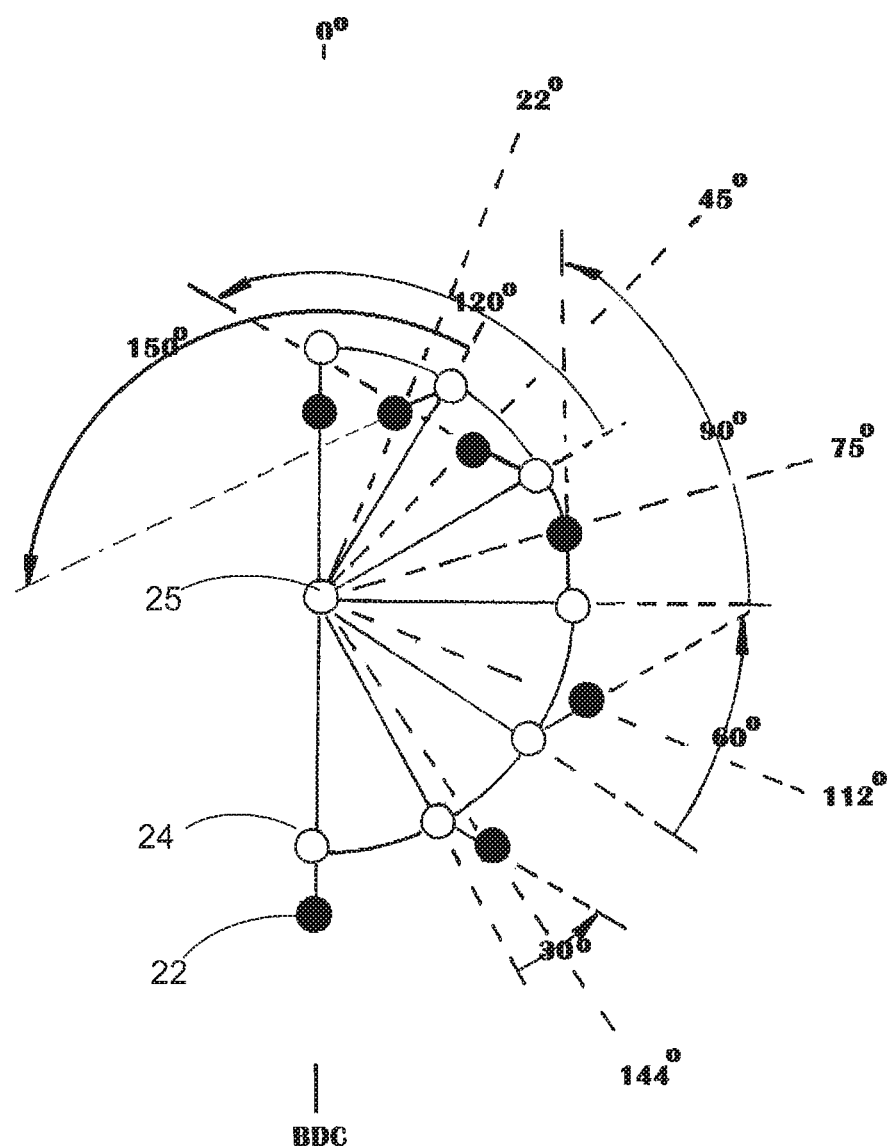
FIG. 3 is a detail view of the system shown in FIG. 1.

The schematic illustration of FIG. 3 shows the orbital path taken by the orbital rod journal 22. FIG. 2 shows how the orbiting pin 22 is mechanically engaged via spur gear set to position itself while it is orbiting around the orbiting body 24. This system gains new advantages for the compression cycle, creates longer constant volume state during the TDC, and improves power strokes by far, compared to the conventional rod journal arrangement. In this embodiment, during the three quarters of combustion cycle, the piston travels much faster, except around TDC, and brings the charge to the TDC with less time for atomization. It then provides a very small motion (almost zero) from 30° before TDC to 30° after TDC. Thus there is 60° of essentially constant volume, extending the actual time of constant volume combustion from perhaps 0.0018/sec at idle in a conventional engine to about 0.0138/sec.

FIG. 2 still shows that when the piston is in the return motion towards the center of rotation, a new speed sequence of the piston's engagement will provide an excellent torque conversion throughout the power cycle. At the beginning of torque conversion, when the pressure is at the highest possible level, due to Extended CVC period, the concept provides very slow motion of the piston. The pressure will depressurize a lot slower and bring some useful pressure to the end of power stroke, extending the duration of truth and practical stroke.

In greater detail, FIG. 3 shows the geometrical behavior of the orbital rod journal 22 that can be seen in terms of how it is exiting out of circular motion; when the conventional rod journal 24 position is 150°. The orbital rod journal 22 will orbit its own body around center shaft 25 and position itself at 144° to the main center of rotation. When the conventional rod journal 24 position is 120°, the orbiting rod journal 22 will be at 112°. When the conventional rod journal 24 position is 90° the orbiting rod journal 22 will be at 75° of crankshaft motion. When the conventional rod journal 24 position is at 60° the orbiting rod journal 22 will be at 45°. When the conventional rod journal 24 is at 30°, the orbiting rod journal 22 stops moving away from the center of rotation 25. When the orbiting body 24 is at 0°, the orbiting rod journal 22 is also at 0° but has also rotated its body 360° around the center of orbiting body 24.

The orbital rod journal can be set at a greater or lesser distance from the center of the revolving rod journal depending on the type of fuel used and various engine efficiency requirements. For example, reducing the maximum distance of the center of the orbital rod journal to the center of the revolving rod journal reduces the speed of the piston from BDC to TDC, and reduces the constant volume combustion duration. Further increasing the distance 9, passing beyond the maximum set coefficient, will cause interruption of accomplished rotary inertia. The piston will dip toward the main shaft at TDC, momentarily decreasing, and then again increasing the compression volume. Generally, though not always, this will be undesirable.

In order to understand the interdependence of the cylinders in a V-combined orbiting rod journals configuration, FIGS. 4-7 show the engine in sequential stages of rotation. In order to compare the effect of combined orbiting rod journals and conventional piston response, it is understandable that connecting rod of conventional concept would be shorter for the length of the selected eccentric coefficient. Dashed line presents positions of the pistons if they are linked to the conventional rod journal 24.

Figure 4:
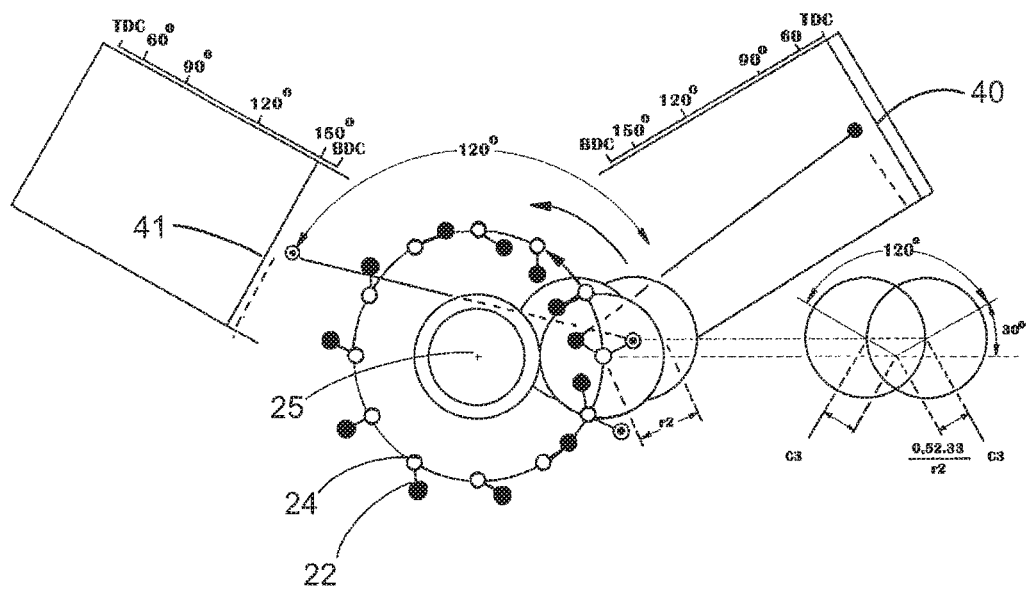
FIG. 4 is a schematic illustration of the operation of the crankshaft and orbiting rod journal system in accordance with an embodiment of the disclosed principles.

In particular, FIG. 4 shows the piston 40 inside cylinder 1 on the right site as it enters the ECVC cycle while the conventional rod journal 24 is still at 30° before its own TDC. Corresponding piston on the left side 41 inside cylinder 2 is at 150° and is at the beginning of the compression state. At the next radial motion of the crankshaft for 30° in counter the clock direction the conventional concept piston would be at TDC, not shown here.

Figure 5:
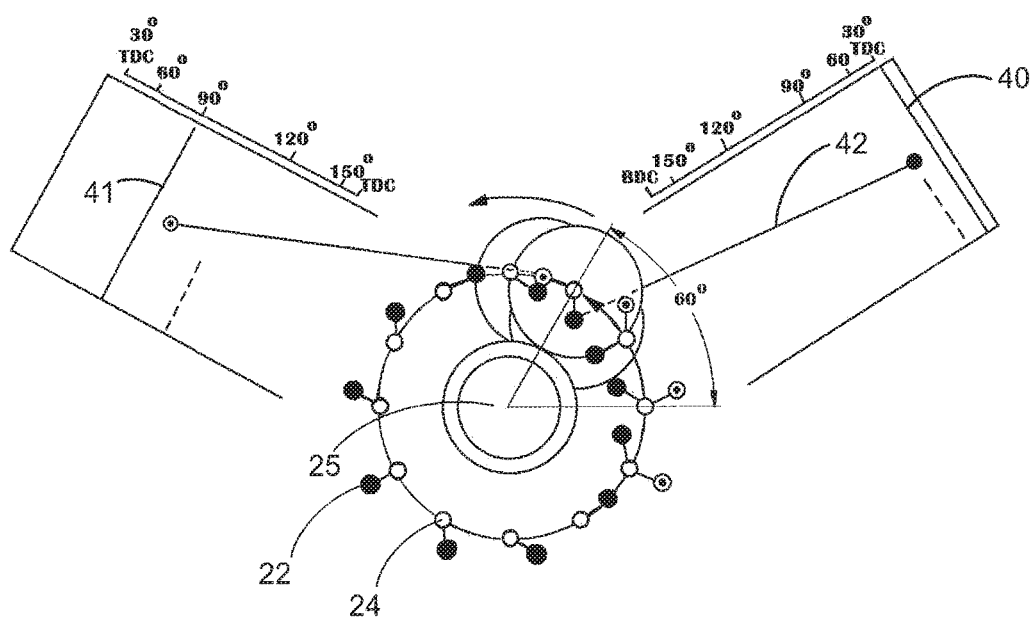
FIG. 5 is a perspective view of a crankshaft and orbiting rod journal system in accordance with an embodiment of the disclosed principles.

FIG. 5 shows that as the crank continues to rotate forward through the next 60°, the orbital rod journal 22 to which the connecting rod 42 (of piston 40) is connected, rotates under the orbiting body, following the straight linear motion creating the CVC. The 60° power gap will be covered with the 180° opposed orbital body over the center of the main journal rotation with an identical orbital rod journal arrangement of the set from another of the 180° as well. Piston 41 will pass a radial angle of 60° from 150° to 90° towards TDC in compression cycle, rotating the main journal 25 via orbiting body 24 and flying arm 96 for 60°.

Figure 6:
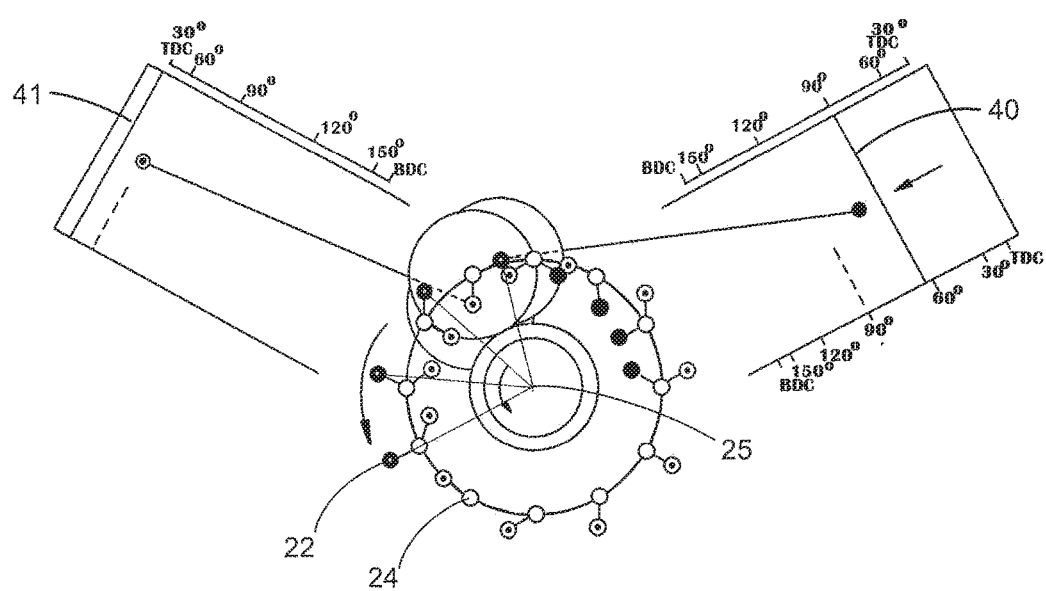
FIG. 6 is a schematic illustration of the operation of the crankshaft and orbiting rod journal system in accordance with an embodiment of the disclosed principles.

Turning to FIG. 6, the crank has continued to rotate and the orbital rod journal 22 linked to piston 41, inside cylinder 2, is now outside of the conventional rod journal path 24, and as such exerts additional torque on the main crank as well as additional force on the orbital rod journal of the second piston 41. This new concept with cylinders of set 120°, piston 40 brings the compression piston 41 to the end of its own physical motion at 90°. This eliminates the need of energy further required to complete the compression cycle at 90°. Conventional V-concept reaches this state at its own 120°, with significantly lower pressure, as can be figured out from this FIG. 6 and piston response scaler provided for comparison. It is noticeable that conventional concept has a volumetric increase twice as large at a power angle of 120°.

Figure 7:
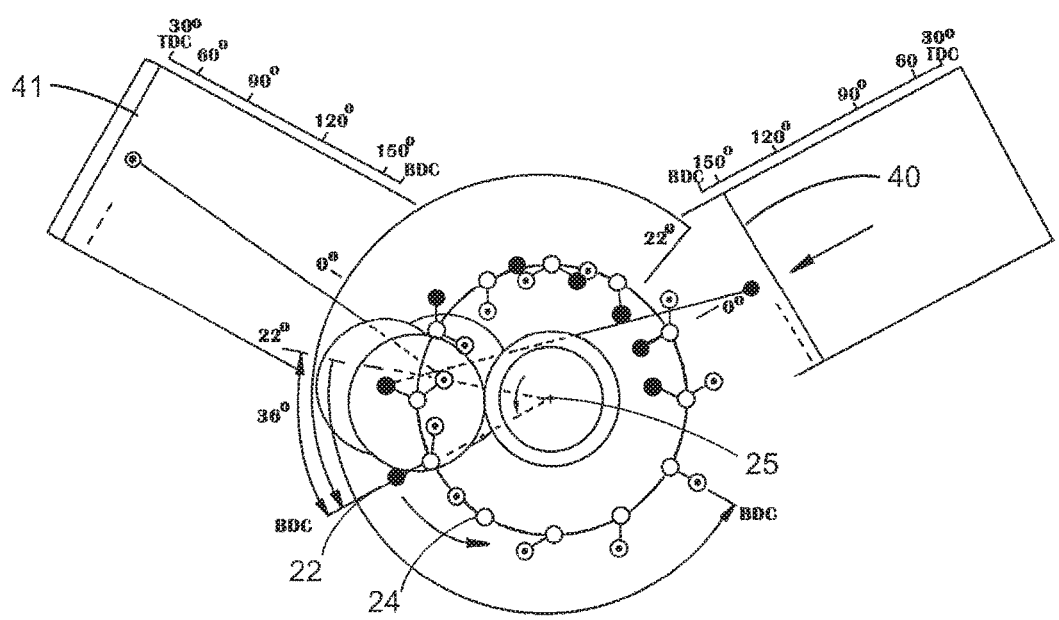
FIG. 7 is a perspective view of a crankshaft and orbiting rod journal system in accordance with an embodiment of the disclosed principles.

Continuing forward, in FIG. 7, the piston of cylinder 2 (41) has remained at TDC, while the power piston of cylinder 1 (40) is now at 150° after TDC. The piston 2 finally ends the CV stage, starts with its own power stroke, and creates a power overlap in a duration of 360° over piston's 1 power stroke. As such, there is no power gap that appears by the conventional concept due to, short practical torque application, short power strokes, as seen even in the conventional advanced V-120°. Moreover, it is mentioned above as one of the advantages of a V-combined orbiting rod journal system. As Piston 1 passes 75°, the orbiting rod journal 22 starts to exit out of the conventional circular path of 360 ° and increases a better leverage position relative to the center of revolution until it reaches BDC. As such, it provides higher torque extraction and conversion than a conventional ICE in this range.

Figure 8:
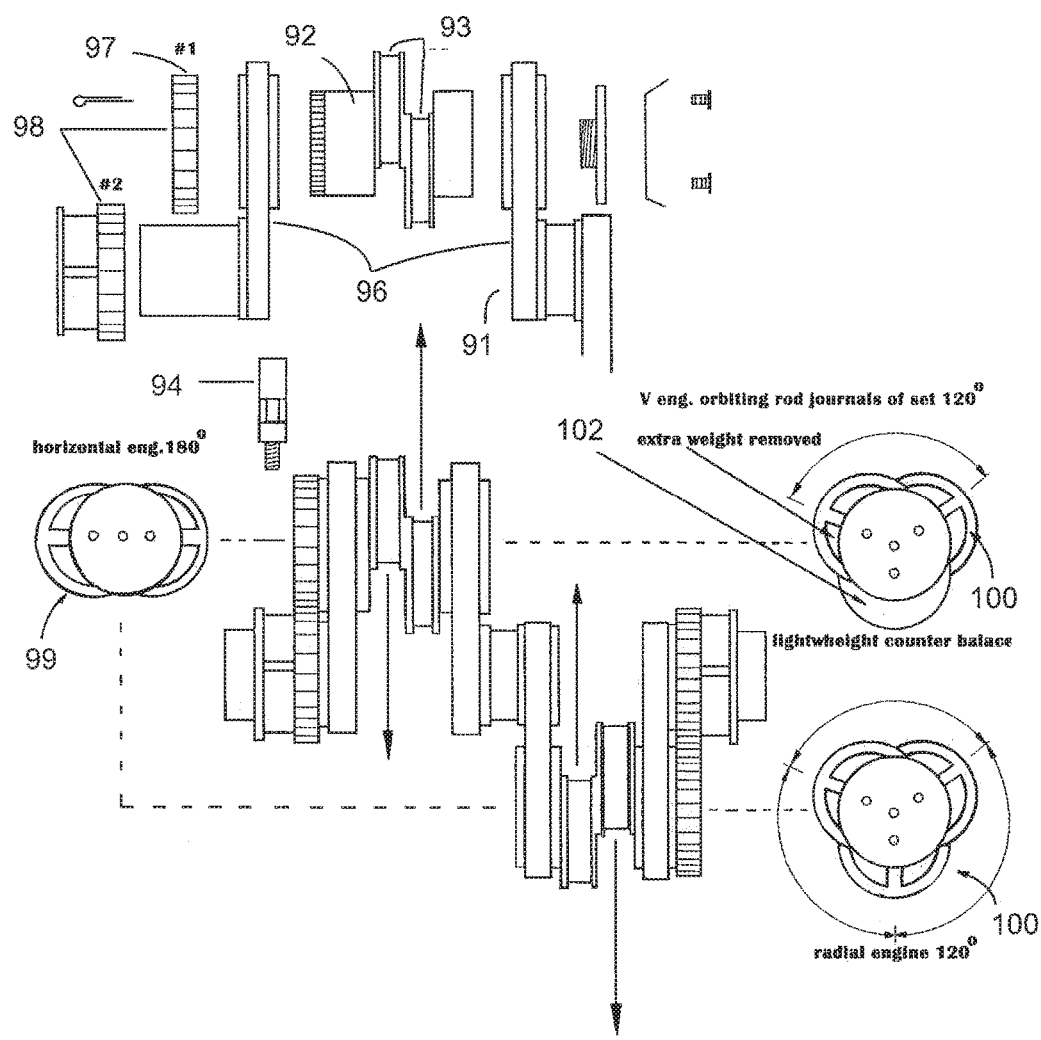
FIG. 8 is a perspective view of a crankshaft and orbiting rod journal system in accordance with an embodiment of the disclosed principles.
Figure 9:
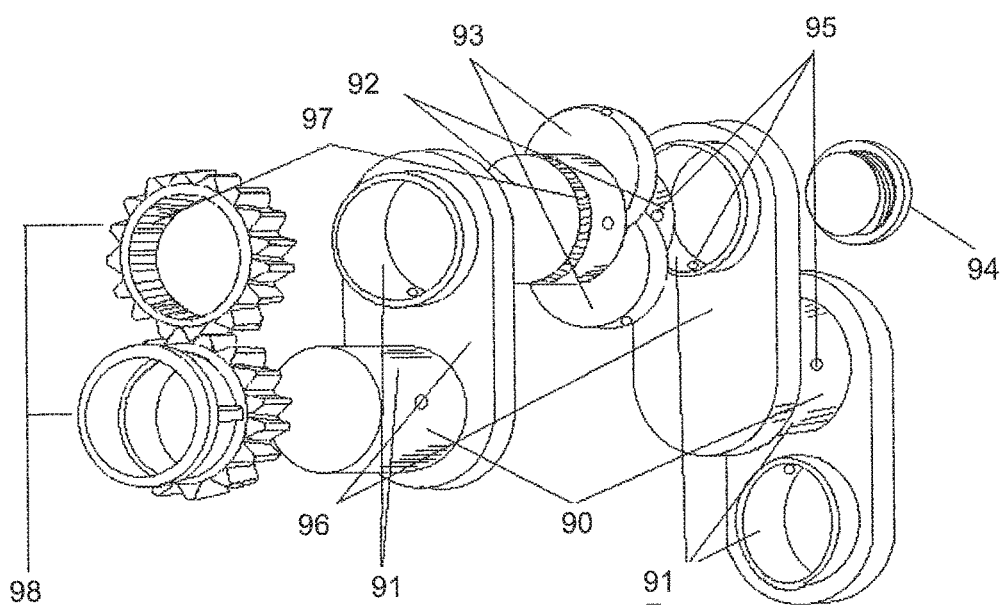
FIG. 9 is a perspective view of a further crankshaft and orbiting rod journal system in accordance with an embodiment of the disclosed principles.

FIGS. 8 and 9 are simplified 2-D perspective views of a crankshaft and orbiting body with orbiting rod journals system in accordance with an embodiment of the disclosed principles. As can be seen, the crank includes main journals 90, oil film slide bearings 91, the orbiting body 92, orbiting rod journals 93, an orbiting body cap 94, conventional lubricating system passages 95, and flying arms 96. In addition, the setup includes a press-fit gear 97 as part of a spur gear set 98. The press-fit gear 97 rotates with the orbiting body 92 while the other member of the spur gear set 98 is fixed to the engine and does not rotate.

To show the arrangement of orbital rod journals (orbiting body lobes) for various engine types, FIG. 9 includes separate specifications for a horizontal engine 99, for a v-type engine 100, and for a radial engine 101. Note that in the orbital body configuration for a V-type 11 engine 100, one of the counterweights 102 may be used to smooth the orbiting rod journal operation.

Figure 10:
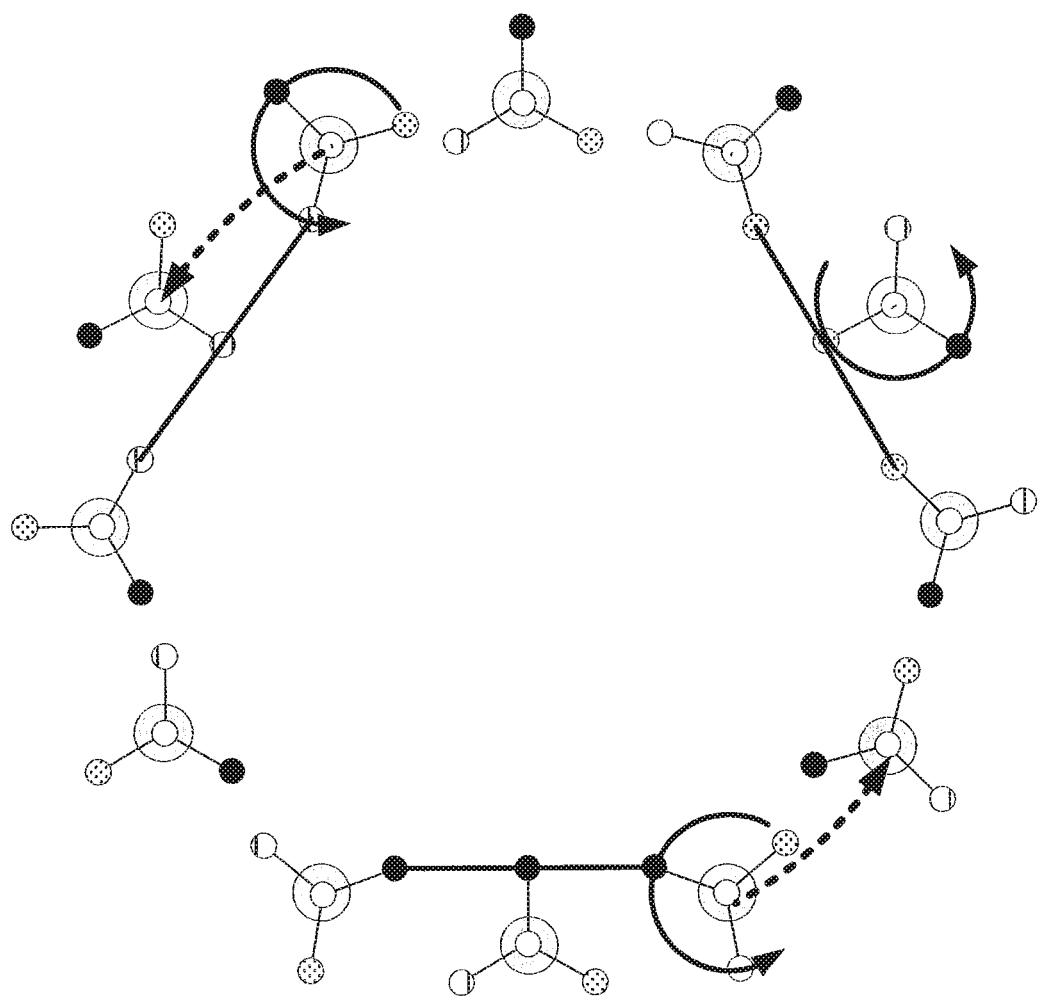
FIG. 10 is a schematic illustration of the operation of the crankshaft and orbiting rod journal system in accordance with a radial embodiment of the disclosed principles.

FIG. 10 is a schematic illustration of the operation of the crankshaft and orbiting rod journal system in accordance with a radial embodiment of the disclosed principles. Radial engines are limited in implementation of many accessories and variable systems developed today. Just to mention some of them; VVTI, VCR, and others which are based on camshaft rotation have to be excluded, for the simple mechanical reason. In the radial old concept, each cylinder with its own valve lifters axis is radially offset from another at a different angle around the center of rotation. All the lifters are linked to the crankshaft lobes and don't utilize a separated rotational axis, which can be rotationally advanced or retired, (today's camshaft). So all the advantages that could be achieved with improved and redesigned traditional crankshaft by ICE engines can also be achieved with an improved "V" and improved Horizontal concept. Radial engines have been resting for the decades for further development, and if they ever come back, this arrangement may be used as an initial stage for further development. There are many accessories that cannot be implemented for mechanical reasons. Even though, valve control could be achieved in modern times with solenoids and advanced computer controls, this would still not give enough reason to go back to four cycle radial concept with a valve system.

Figure 14:
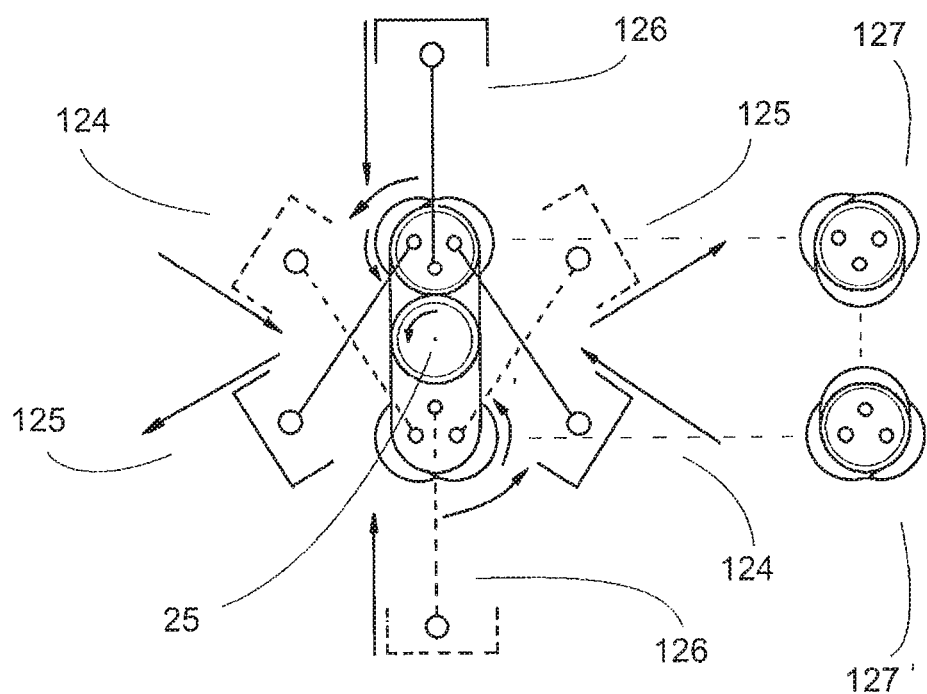
FIG. 14 is a schematic illustration of the operation of the crankshaft and orbiting rod journal system in accordance with a radial embodiment of the disclosed principles.

As noted, FIG. 10 illustrates a radial version of the ECVC engine configuration. As can be seen, the rotational angle of the crankshaft allows each piston to counter-balance eccentric forces. In particular, each piston has a paired piston, that constantly neutralizes the eccentric forces. It is created by any three piston's 120° offset, such that there is motion in an opposed direction from the center of rotation. If the orbital body with orbiting rod journals is opposed or mirrored on a flat plane of the crankshaft, then the pistons will balance each other's forces. It is expected, that ECVC, if set in this geometrical arrangement, will end up with an engine with overlapped power forces, and resolved gyroscoping forces. Thus the engine would now be suitable for high altitude flight and constant load applications. The radial concept within the ECVC principles is further shown in FIG. 14 but will not be discussed in greater detail herein.

Figure 11:
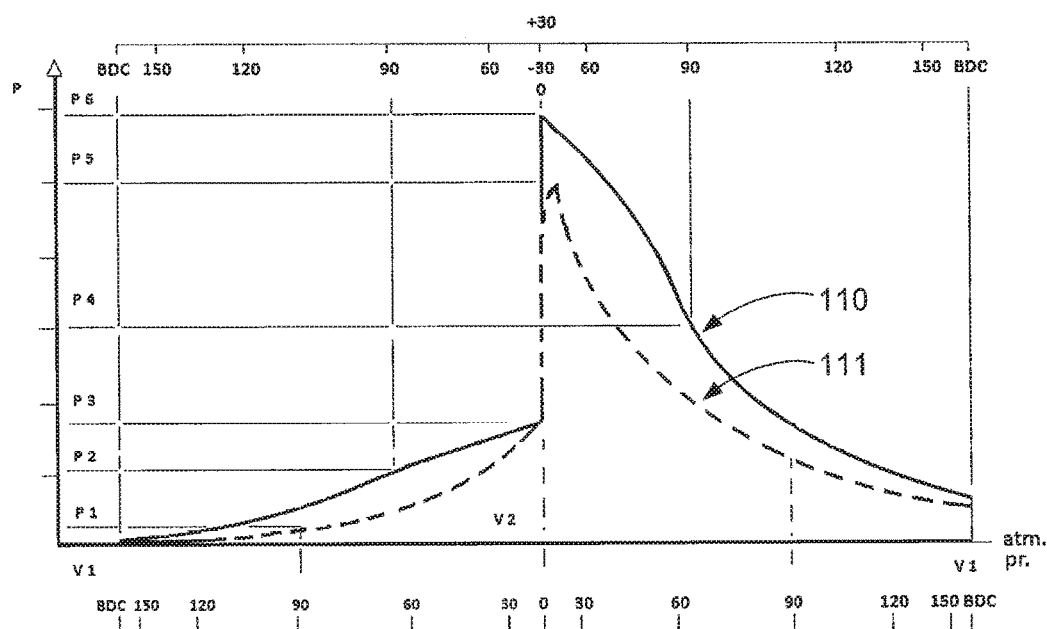
FIG. 11 is a comparative data plot showing the pressure curves for a traditional engine and an engine in accordance with an embodiment of the disclosed principles.
Figure 12:
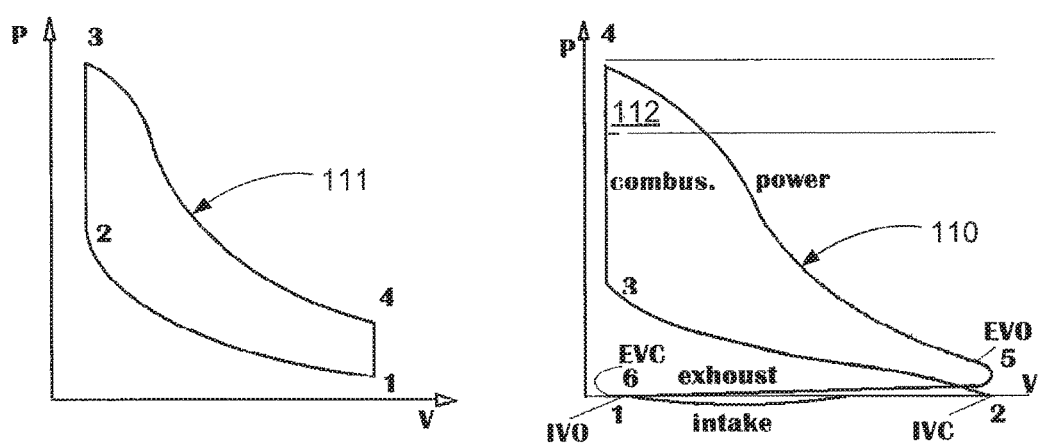
FIG. 12 is a further comparative data plot showing the pressure curves for a traditional engine and an engine in accordance with an embodiment of the disclosed principles.

FIGS. 11 and 12 show the pressure/volume curves for a conventional ICE and for an ICE in accordance with an embodiment of the disclosed principles. Although such curves are normally represented as extending and retracting to form pressure/volume functions as in FIG. 12, the curves are separated across the TDC point in FIG. 11 so that the details can be appreciated as a function of crank position and piston's response. The bottom scalar presents piston's response by conventional concept, while the top scalar presents ECVC concept.

FIG. 11 shows comparison between the plot 110 for the new ICE and the plot 111 for a traditional ICE. Due to reversed pattern of speed of piston engagement; ECVC 110 concept exhibits a faster pressure buildup of the charge or the air only compared to the conventional system 111 by 90° projected at the P2 level, versus the conventional concept at the P1 level. Both concepts may keep the initial pressure at the same safe level P3 if fuel molecules are present in the compression cycle. New ICE yields higher peak pressures at level P6 versus the conventional concept at the P5 level, due to the extra extended time at TDC and full combustion. Considering that now reversed pattern of speeds created here, the piston is engaged to decrease the volume a lot slower until about 90°, also therefore yields a higher potential of pressure/energy under the curve 110, and is projected at the P4 level, versus the conventional power stroke position at 90°, which is lot lower.

FIG. 12 shows a theoretical PV diagram, for thermodynamic calculation. The various phases can be seen as well, i.e., the adiabatic transition, the isovolumetric and isobaric transition, the isometric expansion process, and the constant volume heat removal process.

The PV diagram on the right shows a practical PV diagram. In this figure, it can be seen that the new ICE provides a region of additional heat input with no negative work required (region 112).

Figure 13:
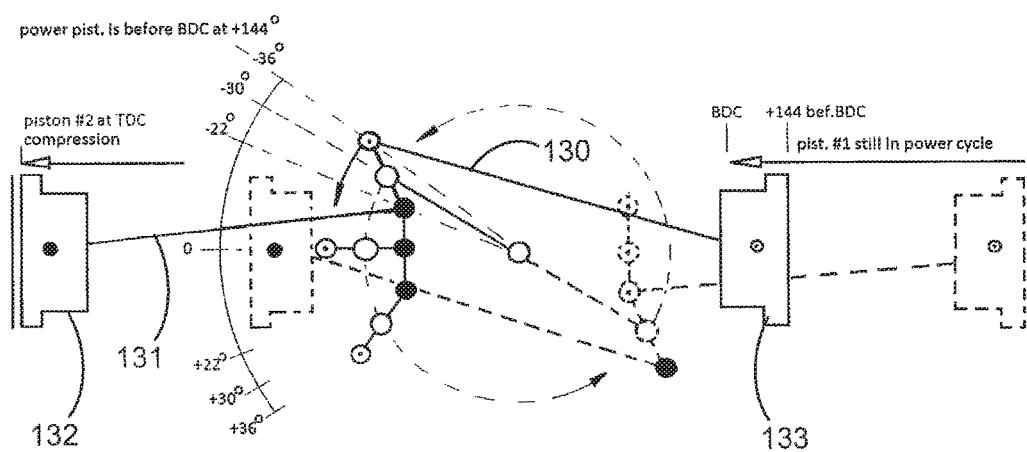
FIG. 13 is a schematic illustration of the operation of the crankshaft and orbiting rod journal system in accordance with an opposed twin embodiment of the disclosed principles.

Turning to FIG. 13, this figure shows the operation of an opposed twin-cylinder embodiment of the new horizontal ICE. It will be appreciated that, as with the other configurations, two or more such assemblies may be stacked to yield higher number cylinder engines.

In the illustrated combined and opposed twin configuration, the connecting rods 130, 131 are connected to two orbiting rod journals on one orbiting body arranged at 180° from one another. This orbiting body is shown in greater detail in configuration 99 of FIG. 8. As can be seen from FIG. 13. the power piston 133 will be at 144° of the power stroke and brings the compression piston to the end of its mechanical motion. ECVC concept expects to bring enough pressure at that radial angle, considering other advantages that are named above. Constant volume period for the piston in compression piston 132 will stay until +22° of orbiting path of piston 132. From 0° to 22° it represents a power gap until the "compressed" piston begins delivering compression. During this gap, inertia provided by the flywheel or other inertial member will supply the rotation energy needed. This concept pairs and physically lines up the piston 1 with piston 2 in a new geometrical fashion, that creates more balance in between forces occurring during operational cycles. This concept keeps the same firing order RLLR, and shortens the length of crankshaft even more than conventional horizontal engines on the market. This concept allows to mechanically connect one flat plane crankshaft like this to another, using a simple mirrored effect if desired to obtain more pistons.

It will be appreciated that a system and method for improved engine operation has been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as they may come within the scope of the following claims and equivalents thereof.

I claim:

1. An internal combustion engine comprising: a crankcase; a rotating crankshaft held by the crankcase and having at least two main journals in the crankcase; an orbiting body having an orbiting body axis and being rotatably affixed to the rotating crankshaft and offset from a central longitudinal axis of the crankshaft; at least one orbiting rod journal on the orbiting body and offset from the orbiting body axis, the at least one orbiting rod journal being rotatably affixed by a connecting rod to a piston within a cylinder; and at least two meshed gears in a 1:1 ratio linking the orbiting body to the crankcase such that rotation of the crankshaft causes orbiting of the at least one orbiting rod journal around the orbiting body axis and orbiting of the orbiting body around the central longitudinal axis of the crankshaft, wherein the orbiting of the at least one orbiting rod journal around the orbiting body axis combined with the orbiting of the orbiting body around the main journal, results in a period of substantially constant volume of a combustion chamber through the rotation of the crankshaft.

2. The internal combustion engine in accordance with claim 1, wherein the period of substantially constant volume of the combustion chamber through the rotation of the crankshaft by the piston within the cylinder spans about 60° of the crankshaft rotation, or less.

3. The internal combustion engine in accordance with claim 1, wherein the at least two meshed gears comprise two spur gears.

4. The internal combustion engine in accordance with claim 1, wherein the at least one orbiting body comprises an opposed pair of orbiting rod journals separated by 180°.

5. The internal combustion engine in accordance with claim 1, wherein the at least one orbiting body comprises an opposed pair of orbiting rod journals separated by less than 180°.

6. The internal combustion engine in accordance with claim 1, wherein the at least one orbiting body comprises three orbiting rod journals offset from one another about the center of the orbiting body axis by 120°, having orbiting body journals disposed at 6020 , 180°, and 300° about the orbiting body axis.

7. The internal combustion engine in accordance with claim 1, further comprising a second orbiting body rotationally offset about the central longitudinal axis of the crankshaft from the first orbiting body, and wherein the engine has a flat four configuration.

8. The internal combustion engine in accordance with claim 1, wherein the engine is a two cycle engine.

9. The internal combustion engine in accordance with claim 1, wherein the engine is a four cycle engine.

10. The internal combustion engine in accordance with claim 1, wherein the engine is naturally aspirated.

11. The internal combustion engine in accordance with claim 1, wherein the engine is aspirated by forced induction.

* * * * *